J. SCHWERTNER.
AUTOMATIC PIANO PLAYER.
APPLICATION FILED MAR. 6, 1912.
1,077,167.
Patented Oct. 28, 1913.
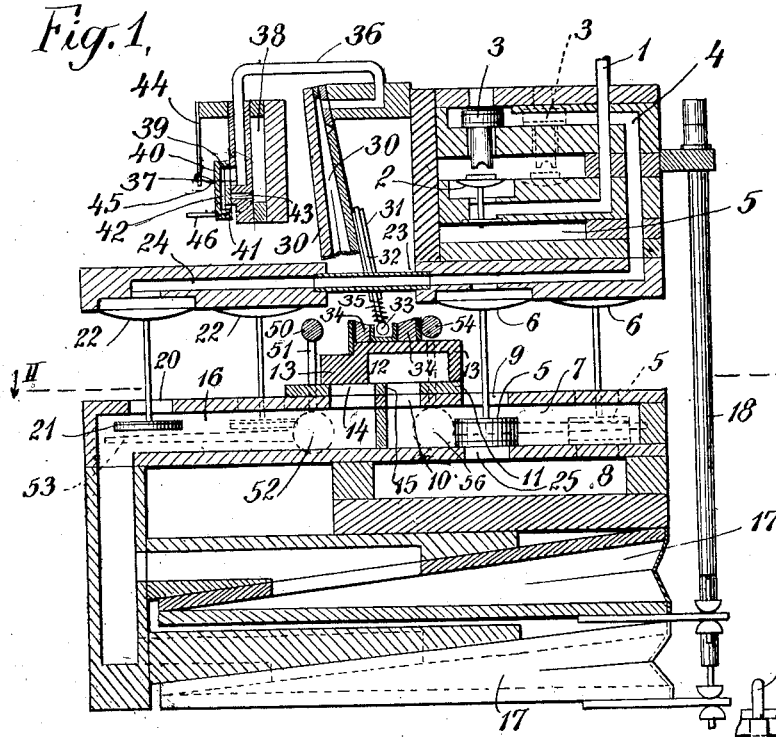
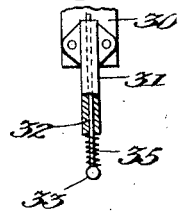
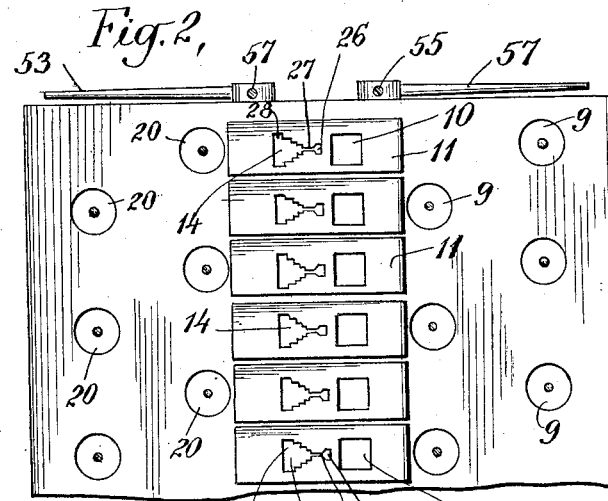
WITNESSES:
T. E. Raftery
J. O. Gumpler
INVENTOR
Joseph Schwertner
BY
Kenyon & Kenyon
ATTORNEYS

UNITED STATES PATENT OFFICE.

JOSEPH SCHWERTNER, OF NEW YORK, N. Y., ASSIGNOR TO HEERWAGEN COMPANY, A CORPORATION OF NEW YORK.

AUTOMATIC PIANO-PLAYER.

1,077,167. Specification of Letters Patent. Patented Oct. 28, 1913.

Application filed March 6, 1912. Serial No. 681,983.

*To all whom it may concern:*

Be it known that I, JOSEPH SCHWERTNER, a citizen of the United States, and a resident of New York, county of New York, and State of New York, have invented certain new and useful Improvements in Automatic Piano-Players, of which the following is a specification.

My invention relates to automatic piano players and the like, and is especially directed to improvements whereby as complete manual control may be had of the music as if it were being manually played.

A further object of the invention is to provide an extremely simple form of apparatus which is economical and easy to manufacture, efficient in use and not liable to get out of order.

Further objects, features and advantages will more clearly appear from the detailed description given below taken in connection with the accompanying drawing which forms a part of this specification.

In the drawing, Figure 1 is a vertical section through part of a piano mechanism embodying my invention in one form; Fig. 2 is a section taken on the line II—II of Fig. 1; Fig. 3 is a front view of parts shown in Fig. 1. Fig. 4 is a detail view of certain parts shown in Fig. 1.

Referring to the various figures, 1 represents the usual wind ducts leading from the tracker board to the primary pneumatics 2 which operate the primary valves 3 controlling the exhaustion of wind ducts 4 from wind trunk 5. The wind ducts 4 lead to the secondary pneumatics 6 which operate the secondary valves situated in separate wind channels 7. The valves 5 control the exhaustion of the wind channels 7 from the main wind chest 8 so that upon atmospheric pressure being admitted to the wind duct 1, the corresponding valve 7 is raised, closing the exhaust or atmospheric port 9 and producing exhaustion in the channel 7 in a manner clearly understood by those skilled in the art. Leading from each wind channel 7 is a port 10 which extends upwardly through a block 11 which is fixed rigidly to the framework. From the block 11 the port 10 extends into a space 12 in a block 13 slidably mounted on top of the block 11. The wind space 12 connects with a port 14 leading through the block 11 on the opposite side of a partition 15 from the port 10. From the space 12 the port 14 leads to a continuation 16 of the wind channel 7 which leads to the power or striking pneumatic 17 which operates the sticker 18 to sound the corresponding note in a well known manner. It will be understood that there is a wind channel 7, 16 for each power pneumatic 17 corresponding to each note, and a separate slidably mounted block or valve 13 for each wind channel 7, 16, which blocks or valves are independently movable with respect to one another and act as throt-valve 13 for each wind channel 7, 16, which spectively. 20 indicates exhaust or atmospheric ports for exhausting the part 16 of the wind channels 7, 16, which ports are adapted to be closed by valves 21 operated by pneumatics 22 operatively connected with the wind ducts 4 by pipes 23 and passages 24, so that the exhaust port 20 is closed each time the corresponding secondary valve 5 is raised to close its exhaust port 9, and exhaust port 20 is opened each time corresponding port 25 is closed.

Referring more especially to Fig. 2, it will be seen that the port 14 in the block 11 is of peculiar shape, having a small end portion 26 connected by a narrow neck portion 27 with a gradually enlarged portion 28. As shown in Fig. 1, the throttling block 11 completely covers the enlarged portion 28 and the neck 27, but the small end portion 26 is uncovered so that the wind channel 7, 16 is open but greatly restricted or throttled, so that if the secondary valve be operated, the striking pneumatic 17 will operate with but very little or pianissimo force. If the throttling valve 13 be moved farther to the left in Fig. 1 so as to uncover a portion of the neck portion 27, the note will be struck with a slightly greater or piano force, and if the valve 13 be moved still farther to the left so as to uncover a portion of the enlarged portion 28, the note will be struck with still greater mezzo-forte force, and so on by gradations of any value until the note is struck or accented with the greatest force. Thus the power pneumatic may be operated and the note struck with any one of an infinite number of gradations of force. It will be noted that the enlarged portions 28 increase in width by steps of gradually increasing length. This has been found to give the good results and is easy of manufacture. It will also be noted that the valve varies the effective cross-section of the wind channel disproportionately to the amount of movement of the valve and this feature is of great importance.

For the purpose of moving the throttling valves 13 to produce the requisite volume of accompaniment or relatively subdued notes and accentuation of the notes, pneumatics 30 are provided, one for each valve 13. A hollow member 31 is attached to the movable side of each of the pneumatics 30 in which hollow member is slidably mounted a rod 32 having an enlarged portion 33 at its lower end, which enlarged portion is adapted to engage abutments 34 rigid with the block 13. A spring 35 forces the member 32 downwardly so that it will always lie between the abutments 34. To operate or exhaust the pneumatics 30, each is connected with a wind duct 36 leading to a port 37. Each port 37 is adapted to be connected to a wind trunk 38 by means of a sliding valve 39 provided with ports 40 and 41 and a connecting passage 42. The port 41 is adapted to coöperate with a port 43 leading to the wind trunk 38. In Fig. 1, the valve 39 is shown in a position such that the duct 36 is connected to the outside atmosphere through port 41 so that pneumatic 30 is expanded, forcing the throttling valve 13 to the right. If, now, the valve 39 be moved up, the duct 36 will be connected to the wind trunk 38 through the ports 41 and 43, causing the pneumatic 30 to collapse, thus moving the valve 13 to the left in Fig. 1. Each sliding valve 39 is held to its seat by a leaf spring 44 and link 45, and a pin 46 serves as a means for moving the valve up and down. Therefore, to cause any note to be accented, the corresponding valve 39 is moved up, thus exhausting the corresponding pneumatic 30 and moving the corresponding throttling valve 13 to the left so as to decrease the throttling in the channel 7, 16. The amount of accentuation may be determined or limited by adjusting the position at which the valves 13 stop in their movement to the left. This is accomplished by an adjustable stop bar 50 extending in front of all of the abutments 34 fixed on the front of the valves 13. The bar 50 is carried at its ends by uprights 51 pivoted at 52, and rigidly connected with arms 53. Thus, by moving the arms 53, the position of the stop 50 may be adjusted to any point desired so the volume or amount of accentuation of the notes may be made anything desired at the will of the operator. In a similar manner, a stop bar 54 extends in back of all the abutments 34 on the back of the valves 13 to limit the movement of the valves 13 in the pianissimo direction, the bar 54 being carried at its ends by uprights 55 pivoted at 56 and rigidly connected with operating arms 57 by means of which the position of the bar 54 is manually adjusted to adjust the volume of the accompaniment or relatively subdued notes to any point desired. Any suitable means at the front of the piano may be suitably connected with the arms 53 and 57 whereby these arms may be manually operated from the front of the piano. An arrangement for this purpose may be employed similar to the common forms of tempo regulators or similar to the tempo regulator described in my co-pending application for Letters Patent Serial No. 624038. The valves 39 may be operated by hand to select the notes to be accented, or an apparatus like that described in my co-pending applications Serial No. 535585 and Serial No. 631409 may be employed for this purpose. It will thus be clear that I have provided a throttling valve of peculiar structure for each note or wind channel 7, 16, movement of which valve in one direction causes the corresponding note to be played loudly, and movement of which in another direction causes the corresponding note to be played softly, and means for varying the limit of movement of said valves in one direction to adjust the volume of accenting, and means for varying the limit of movement of said valves in the other direction to vary or adjust the volume of the relatively subdued notes.

By providing a plurality of throttling valves various notes may be independently regulated so that by suitable means any desired notes may be selected for accenting, while the remainder may be played softly for accompaniment, and the relative volume of accenting and accompaniment may be regulated as desired.

By the terms "throttling" and "throttle valve" I mean a valve or device which is adapted to maintain the flow of air choked to various degrees, that is, which is adapted to remain in various positions to throttle the flow of air to various degrees, as distinguished from purely a cut-off valve, which is intended to remain only in its extreme positions of full open or complete shut-off.

It will be noted that when the throttling valve 13 is in the position shown in Fig. 1, only a very small portion 26 of the port 14 is open, so that upon the closing of the port 25 by the valve 5, there is only a small opening through which the portion 16 of the wind channel may be exhausted. This small opening may not be large enough to sufficiently quickly allow the pressure in the striking pneumatic 17 to return to atmospheric, and I therefore provide the separate exhaust port 20 in the part 16 of the wind channel, which port is opened by the valve 21 operating simultaneously with the valve 5.

Although I have described my improvements in great detail and with respect to a particular embodiment thereof, nevertheless I do not desire to be limited to such details except as clearly specified in the appended claims, since many changes and modifications may well be made by those skilled in the art without departing from the spirit and scope of my invention in its broadest aspect.

Having fully and clearly described my improvements, what I claim as new and desire to secure by Letters Patent, is:

1. The combination of a plurality of striking pneumatics, a wind chest, a wind channel leading from each striking pneumatic to the wind chest, and a sliding throttling valve for each wind channel for varying the force with which the striking pneumatics operate.

2. The combination of a plurality of striking pneumatics, a wind chest, a wind channel leading from each striking pneumatic to the wind chest, a sliding throttling valve for each wind channel for varying the force with which the striking pneumatics operate, said valve varying the effective cross-section of the wind channel disproportionately to the amount of movement of the valve, and a valve for each pneumatic for controlling the operation thereof.

3. The combination of a plurality of striking pneumatics, a wind chest, a wind channel leading from each striking pneumatic to the wind chest, a sliding throttling valve for each wind channel for varying the force with which the striking pneumatics operate, movement of which valve in one direction causes the corresponding note to be played loudly and movement of which valve in another direction causes the corresponding note to be played softly, and automatic means for opening and closing each wind channel to the wind chest.

4. The combination of a plurality of striking pneumatics, a wind chest, a wind channel leading from each striking pneumatic to the wind chest, a throttling valve for each wind channel for varying the force with which the striking pneumatics operate, movement of which valve in one direction causes the corresponding note to be played loudly and movement of which valve in another direction causes the corresponding note to be played softly, and means for varying the limit of movement of said valves in one direction to vary the amount of accenting.

5. The combination of a plurality of striking pneumatics, a wind chest, a wind channel leading from each striking pneumatic to the wind chest, a throttling valve for each wind channel for varying the force with which the striking pneumatics operate, means for moving the valve in one direction to cause the corresponding note to be played loudly and in another direction to cause the corresponding note to be played softly, and means for varying the limit of movement of said valves in one direction to vary the volume of the relatively subdued notes.

6. The combination of a plurality of striking pneumatics, a wind chest, a wind channel leading from each striking pneumatic to the wind chest, a throttling valve for each wind channel for varying the force with which the striking pneumatics operate, movement of which valve in one direction causes the corresponding note to be played loudly and movement of which valve in another direction causes the corresponding note to be played softly, means for varying the limit of movement of said valves in one direction to vary the amount of accenting, and means for varying the limit of movement of said valves in another direction to vary the volume of the relatively subdued notes.

7. The combination of a plurality of striking pneumatics, a wind chest, a separate wind channel leading from each striking pneumatic to the wind chest, a sliding throttling valve for each wind channel for varying the force with which the corresponding striking pneumatic operates, and mechanical means mechanically connected to each of said valves for independently moving each of said valves.

8. The combination of a plurality of striking pneumatics, a wind chest, a wind channel leading from each striking pneumatic to the wind chest, a throttling valve for each wind channel for varying the force with which the striking pneumatics operate, movement of which valve in one direction causes the corresponding note to be played loudly and movement of which valve in another direction causes the corresponding note to be played softly, means for varying the limit of movement of said valves in one direction to vary the amount of accenting, means for varying the limit of movement of said valves in another direction to vary the volume of the relatively subdued notes, automatic means for independently opening and closing each wind channel to the wind chest, and means independently moving each of the throttling valves in either direction and selecting the valves to be so moved.

9. The combination of a plurality of striking pneumatics, a wind chest, a wind channel leading from each striking pneumatic to the wind chest, a throttling valve for each wind channel for varying the force with which the striking pneumatics operate; a supply valve for each wind channel controlling the opening and closing of the wind channel to the wind chest and situated between the wind chest and the throttling valve, and an exhaust valve for each wind channel and situated between the striking pneumatic and the throttling valve.

10. The combination of a wind channel, a striking pneumatic supplied thereby, a pneumatically operated throttling device for more or less opening and closing said wind channel, a wind chest supplying said wind channel to operate the pneumatic, and means for adjusting the limit of movement of the throttling device in both directions of opening and closing.

11. In a musical instrument, the combination of a plurality of striking pneumatics, a wind channel leading to each pneumatic, means adapted to throttle each wind channel to various degrees, and means whereby some of the throttling means for some of the channels are caused to throttle the same more than others, said throttling means comprising sliding valve closures.

12. In a musical instrument, the combination of a plurality of striking pneumatics, a wind channel leading to each pneumatic, means adapted to throttle each wind channel to various degrees, means for adjusting said throttling means during the operation of the instrument to vary the amount of throttling of the channels, and means for selecting only certain of said throttling means for adjustment.

13. In a musical instrument, the combination of a plurality of speaking devices, a wind channel controlling the operation of each speaking device, adjustable means adapted to throttle each channel to various degrees, and means for selecting only certain of said throttling means for adjustment.

14. The combination of a plurality of striking pneumatics, a wind channel leading to each pneumatic, independently movable throttling valves in said wind channels adapted to vary the volume of the notes by substantially infinitely small gradations, and means for simultaneously varying the limit of movement of a plurality of said valves.

15. In a musical instrument the combination of a plurality of striking pneumatics, a wind channel leading to each pneumatic, independently movable throttling valves in said wind channels adapted to vary the volume of the notes by substantially infinitely small gradations, and means whereby part of the valves may be opened to a different extent to cause some of the notes to be accented during the operation of the instrument.

16. In a musical instrument the combination of a plurality of striking pneumatics, a wind channel leading to each pneumatic, independently movable throttling valves in said wind channels adapted to vary the volume of the notes by substantially infinitely small gradations, means whereby part of the valves may be opened to a different extent to cause some of the notes to be accented, and means whereby said extent may be varied during the operation of the instrument.

17. In a musical instrument the combination of a plurality of striking pneumatics and a plurality of independently and automatically operated throttling valves for various pneumatics adapted to vary the force with which said pneumatics operate by substantially infinitely small gradations and means for varying the extent to which said throttling valves may be automatically operated during the operation of the instrument.

18. In a musical instrument, the combination of speaking devices, a plurality of wind channels controlling the operation of the speaking devices, throttling devices in said wind channels adapted to regulate the control of air therethrough, and means whereby some of said devices may be opened to a greater extent than others and the extent to which they are opened varied during the operation of the instrument.

19. In a musical instrument the combination of speaking devices, a plurality of wind channels controlling the operation of the speaking devices, sliding throttling devices in said wind channels adapted to regulate the control of air therethrough, means whereby some of said devices may be opened to a greater extent than others and the extent to which they are opened varied during the operation of the instrument, and means for selecting said devices to be opened to the greater extent.

20. The combination of a plurality of striking pneumatics, a wind chest, a wind channel leading from each striking pneumatic to the wind chest, sliding throttling devices in said wind channels for varying the force with which the pneumatics operate, a valve for each wind channel controlling the opening and closing of the channel between the throttling device and wind chest, and an exhaust valve for each wind channel situated between the throttling device and striking pneumatic.

21. The combination of a plurality of striking pneumatics, means for causing some of said pneumatics to accent the notes and some of the pneumatics to play softly as for accompaniment, and means for varying the relative volume of the relatively subdued notes and accented notes by substantially infinite gradations, said first mentioned means embracing a wind chest and a plurality of wind channels supplying the pneumatics and a throttling valve in each channel regulating the supply of the pneumatics by the wind chest.

22. The combination of a plurality of striking pneumatics, means for causing some of said pneumatics to accent the notes and some of the pneumatics to play softly as for accompaniment, and means for varying the relative volume of the relatively subdued notes and accented notes by substantially infinite gradations, said first mentioned means embracing a wind chest and separate wind channels supplying the pneumatics and a sliding throttling valve in each channel regulating the supply of the pneumatics by the wind chest, and said second mentioned means embracing a plurality of pneumatics for operating said throttling valves.

23. The combination of a plurality of striking pneumatics, a wind chest, a wind channel leading from each striking pneumatic to the wind chest, and separately controllable sliding throttling valves, one for each wind channel, for varying the force with which the striking pneumatics operate, said valve acting to vary the effective cross-section of the wind channel disproportionately to the amount of the movement of the valve, and a valve for each wind channel for opening and closing it to the wind chest.

24. The combination of a plurality of striking pneumatics, a wind chest, a wind channel leading from each striking pneumatic to the wind chest and a sliding throttling valve for each wind channel for varying the force with which the striking pneumatics operate, said valve acting to vary the effective cross section of the wind channel disproportionately to the amount of the movement of the valve, and a valve for each wind channel for opening and closing it to the wind chest, and means for varying the limit of movement of said valves in one direction to vary the force with which the pneumatics operate.

25. The combination of a plurality of striking pneumatics, a wind chest, a wind channel leading from each striking pneumatic to the wind chest and a sliding throttling valve for each wind channel for varying the force with which the striking pneumatics operate, means for varying the limit of movement of said valves in one direction to vary the volume of the relatively subdued notes or the amount of accenting, and a valve for each wind channel for opening and closing it to the wind chest.

26. The combination of a plurality of striking pneumatics, a wind chest, a wind channel leading from each striking pneumatic to the wind chest, a sliding throttling valve for each wind channel for varying the force with which the striking pneumatics operate, said valve acting to vary the effective cross section of the wind channel disproportionately to the amount of the movement of the valve, a supply valve for each wind channel controlling the opening and closing of the wind channel to the wind chest and situated between the wind chest and the throttling valve, and an exhaust valve for each wind channel and situated between the striking pneumatic and the throttling valve.

27. The combination of a plurality of striking pneumatics, a wind chest, a wind channel leading from each striking pneumatic to the wind chest, a sliding throttling valve in each channel for varying the force with which the striking pneumatics operate, said valve acting to vary the effective cross section of the wind channel disproportionately to the amount of movement of the valve, means for varying the limit of movement of each valve in each direction, independent means for causing each valve to move to one or the other of its limits of movement and means for selecting the valves to be moved in one direction and those to be moved in the other direction.

28. The combination of a plurality of striking pneumatics, a wind chest, a wind channel leading from each striking pneumatic to the wind chest, a throttling valve in each channel for varying the force with which the striking pneumatics operate, means for varying the limit of movement of each valve in each direction, independent means for causing each valve to move to one or the other of its limits of movement, and means for selecting the valves to be moved in one direction and those to be moved in the other direction.

29. The combination of a plurality of striking pneumatics, a wind chest, a wind channel leading from each striking pneumatic to the wind chest, a throttling valve in each channel for varying the force with which the striking pneumatics operate, means for varying the limit of movement of each valve in each direction, and means for selecting the valves to be moved in one direction and those to be moved in the other direction.

30. The combination of a plurality of striking pneumatics, a wind chest, a wind channel leading from each striking pneumatic to the wind chest, a sliding throttling valve in each channel for varying the force with which the striking pneumatics operate, said valve acting to vary the effective cross section of the wind channel disproportionately to the amount of movement of the valve, and means for varying the limit of movement of each valve in each direction.

31. The combination of a plurality of striking pneumatics, a wind chest, a wind channel leading from each striking pneumatic to the wind chest, a sliding throttling valve in each channel for varying the force with which the striking pneumatics operate, said valve acting to vary the effective cross section of the wind channel disproportionately to the amount of movement of the valve, means for varying the limit of movement of each valve in each direction, and means for selecting the valves to be moved in one direction and those to be moved in the other direction.

32. The combination of a plurality of striking pneumatics, a wind chest, a wind channel leading from each pneumatic to the wind chest, and a throttling valve in each wind channel, having a valve opening which increases in effective size much faster than the movement of the valve as the valve is opened.

33. The combination of a plurality of striking pneumatics, a wind chest, a wind channel leading from each pneumatic to the wind chest, and a throttling valve in each wind channel, having a valve opening which is small at one end and increases in size so that it is relatively large at the other end whereby the opening increases in effective size much faster than the movement of the valve as the valve is opened.

34. The combination of a plurality of striking pneumatics, a wind chest, a wind channel leading from each striking pneumatic to the wind chest, a sliding throttling valve for each wind channel for varying the force with which the striking pneumatics operate, each valve having an opening which is narrow at one end and increases in width so that it is relatively wide at the other end whereby the opening increases in effective size much faster than the movement of the valve as the valve is opened, and a valve for each wind channel for opening and closing it to the wind chest.

In testimony whereof, I have signed my name to this specification, in the presence of two subscribing witnesses.

JOSEPH SCHWERTNER.

Witnesses:
GORHAM CROSBY,
EDWIN SEGER.

---

Copies of this patent may be obtained for five cents each, by addressing the "Commissioner of Patents, Washington, D. C."